(12) United States Patent
Tang et al.

(10) Patent No.: US 9,611,181 B2
(45) Date of Patent: Apr. 4, 2017

(54) OXIDATION RESISTANT COATINGS, PROCESSES FOR COATING ARTICLES, AND THEIR COATED ARTICLES

(75) Inventors: Xia Tang, West Hartford, CT (US); Tania Bhatia Kashyap, Middletown, CT (US); David C. Jarmon, Kensington, CT (US); Wayde R. Schmidt, Pomfret Center, CT (US); Harry E. Eaton, Jr., Woodstock, CT (US); John G. Smeggil, Simsbury, CT (US)

(73) Assignee: United Technologies Corporation, Farmington, CT (US)

( * ) Notice: Subject to any disclaimer, the term of this patent is extended or adjusted under 35 U.S.C. 154(b) by 993 days.

(21) Appl. No.: 13/088,599

(22) Filed: Apr. 18, 2011

(65) Prior Publication Data

US 2011/0200759 A1    Aug. 18, 2011

Related U.S. Application Data

(62) Division of application No. 11/603,622, filed on Nov. 21, 2006, now Pat. No. 7,951,459.

(51) Int. Cl.
*B05D 3/02* (2006.01)
*C04B 41/89* (2006.01)
(Continued)

(52) U.S. Cl.
CPC .......... *C04B 41/89* (2013.01); *C04B 41/009* (2013.01); *C04B 41/52* (2013.01); *C23C 26/00* (2013.01);
(Continued)

(58) Field of Classification Search
CPC ...................................... C04B 41/89
(Continued)

(56) References Cited

U.S. PATENT DOCUMENTS 2,992,959 A * 7/1961 Schrewelins ............ 428/539.5
3,304,199 A * 2/1967 Faber ....................... C03C 8/14
  252/514
(Continued)

FOREIGN PATENT DOCUMENTS

EP    0672632 A1    9/1995
WO   03099739 A1   12/2003

OTHER PUBLICATIONS

Weissler, Vacuum physics and Technology, 1979, p. 314-315.*

*Primary Examiner* — Tabatha Penny
(74) *Attorney, Agent, or Firm* — Bachman & LaPointe, P.C.

(57) ABSTRACT

A process for applying an oxidation resistant coating to an article includes the steps of mixing at least about 10% by volume to up to about 99% by volume of a slurry at least one silica based material having a viscosity of about $1\times10^2$ poise to about $1\times10^7$ poise at a temperature of about 1,292° F. (700° C.) to about 3,272° F. (1,800° C.) at least about 1% by volume to up to about 90% by volume of the slurry at least one oxygen scavenger, and a liquid medium to form the slurry; coating an article with the slurry to form a slurry coated article; and heat treating under an inert atmosphere the slurry coated article to form an article having at least one oxidation resistant coating layer containing the at least one oxygen scavenger.

16 Claims, 2 Drawing Sheets

(51) Int. Cl.
*C04B 41/00* (2006.01)
*C04B 41/52* (2006.01)
*C23C 26/00* (2006.01)

(52) U.S. Cl.
CPC ........ *Y02T 50/67* (2013.01); *Y10T 428/12611* (2015.01)

(58) Field of Classification Search
USPC ...................................................... 427/376.2
See application file for complete search history.

(56) References Cited

U.S. PATENT DOCUMENTS

| | | | | |
|---|---|---|---|---|
| 3,623,897 | A * | 11/1971 | Wojcik ....................... | 106/14.05 |
| 4,039,997 | A * | 8/1977 | Huang ............... | H01C 17/0656 252/520.2 |
| 4,168,343 | A * | 9/1979 | Arai ..................... | H01L 49/02 252/512 |
| 4,598,024 | A * | 7/1986 | Stinton ................. | C04B 41/009 427/249.19 |
| 4,666,733 | A * | 5/1987 | Wlodek ...................... | 427/451 |
| 4,985,377 | A * | 1/1991 | Iseki ..................... | H01C 7/003 252/520.22 |
| 5,204,289 | A * | 4/1993 | Moh ................................ | 501/5 |
| 5,472,487 | A * | 12/1995 | Chin ........................ | C23C 4/10 106/287.1 |
| 5,518,778 | A * | 5/1996 | Solovjeva ................ | C03C 8/14 427/376.2 |
| 5,569,427 | A * | 10/1996 | Semenova ................ | C03C 8/14 106/286.8 |
| 5,677,060 | A * | 10/1997 | Terentieva et al. ........... | 428/408 |
| 5,871,820 | A * | 2/1999 | Hasz et al. ..................... | 427/419.2 |
| 6,749,942 | B1 * | 6/2004 | Wittenauer et al. .......... | 428/446 |
| 6,919,103 | B2 * | 7/2005 | DiChiara, Jr. ........ | C04B 41/009 427/376.2 |
| 7,767,305 | B1 * | 8/2010 | Stewart et al. ................ | 428/428 |
| 2003/0106311 | A1 * | 6/2003 | Moore et al. ................... | 60/323 |
| 2003/0224181 | A1 * | 12/2003 | Finley ............... | B32B 17/10036 428/432 |
| 2005/0247699 | A1 * | 11/2005 | Abbott .................... | B29C 45/73 219/543 |

* cited by examiner

OXIDATION RESISTANT COATINGS, PROCESSES FOR COATING ARTICLES, AND THEIR COATED ARTICLES

CROSS REFERENCE TO RELATED APPLICATION(S)

The instant application is a divisional patent application of allowed U.S. patent application Ser. No. 11/603,622, filed Nov. 21, 2006, entitled OXIDATION RESISTANT COATINGS, PROCESSES FOR COATING ARTICLES, AND THEIR COATED ARTICLES.

GOVERNMENT RIGHTS

The U.S. Government may have certain rights to this invention pursuant to Contract No. F33615-01-D5802, Subcontract No. S-709-020-001 awarded by the United States Air Force to UES, Inc., located in Dayton, Ohio.

FIELD OF THE INVENTION

The invention relates to coatings and, more particularly, to oxidation protection coatings.

BACKGROUND OF THE INVENTION

Advanced turbine engines and hypersonic engines that are currently being pursued for enhanced performance and improved operational efficiencies will require stable lightweight materials with robust mechanical properties across a wide temperature spectrum, that is, from a room temperature of 65° F. (18° C.) to operating temperatures of 1,200° F. (650° C.) to 3,000° F. (1,650° C.) and greater. Due to these stringent demands, only a limited number of refractory materials such as carbon or ceramic materials, carbon fiber or silicon carbide fiber based composites, monolithic ceramics such as silicon nitride and silicon carbide and refractory based alloys such as those based on molybdenum and niobium can be used. While possessing adequate high temperature mechanical properties, these materials all suffer from inadequate high temperature oxidation resistance.

Most approaches for creating oxidation protective coatings consider the use of silica ($SiO_2$) based high melting point glasses and therefore are not expected to provide protection in the range of 1200° F. (650° C.) to 3000° F. (1650° C.) When teaching the use of refractory silicides for providing an oxidation resistant coating, most approaches frequently require forming high melting silicide compounds or eutectic mixtures of silicides with or without free silicon as disclosed in U.S. Pat. No. 7,060,360 to Eaton, et al., assigned to United Technologies Corporation and incorporated by reference herein in its entirety.

As described in U.S. Pat. No. 5,677,060 to Terentieva, these silicide coatings are created in-situ by high temperature annealing steps that form silica films at high temperatures. In service, such coatings may tend to form complex scales involving mixtures of silica, metal silicates and metal oxides. The combination of these phases (along with the substrate metal silicides themselves) may exacerbate the problems associated with differences in the various coefficients of thermal expansion.

Commercially available coatings for protecting C/SiC substrates typically provide good oxidation protection up to 3000° F. (1650° C.), but significantly decrease the strength of the underlying substrate.

Therefore, there still exists a need for stable refractory metal based protective coatings exhibiting high temperature oxidation resistance.

SUMMARY OF THE INVENTION

In accordance with one aspect of the present invention, a process for applying an oxidation resistant coating to an article broadly comprises mixing at least about 10% by volume to up to about 99% by volume of a slurry comprising at least one silica based material having a viscosity of about $1\times10^2$ poise to about $1\times10^7$ poise at a temperature of about 1,292° F. (700° C.) to about 3,272° F. (1,800° C.) at least about 1% by volume to up to about 90% by volume of the slurry comprising at least one oxygen scavenger, and a liquid medium to form the slurry; coating an article with the slurry to form a slurry coated article; and heat treating under an inert atmosphere the slurry coated article to form an article having at least one oxidation resistant coating layer having a carrier phase containing at least one oxygen scavenger.

In accordance with another aspect of the present invention, a coated article broadly comprises an article having at least one surface having disposed thereupon an oxidation resistant coating comprising a silica based material having a viscosity of about $1\times10^2$ poise to about $1\times10^7$ poise at a temperature of about 1,292° F. (700° C.) to about 3,272° F. (1,800° C.) and at least one or more oxygen scavengers dispersed therein.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

The exemplary protective coatings of the present invention protect refractory materials from oxidation in a range of temperatures from room temperature to up to at least about 3000° F. (1650° C.) and greater. The exemplary protective coatings take advantage of glass materials having low melting point temperatures in combination with oxygen scavenging additives to achieve high mechanical and oxidation resistant properties required by the refractory based substrate. Although especially applicable to low thermal expansion composite substrates such as C/SiC, SiC/SiC or SiC/SiNC and monolithic $Si_3N_4$, the basic architecture of the protective coatings described herein is also applicable to all refractory materials requiring oxidation protection over a broad temperature range to ensure optimal performance.

Figure 1:
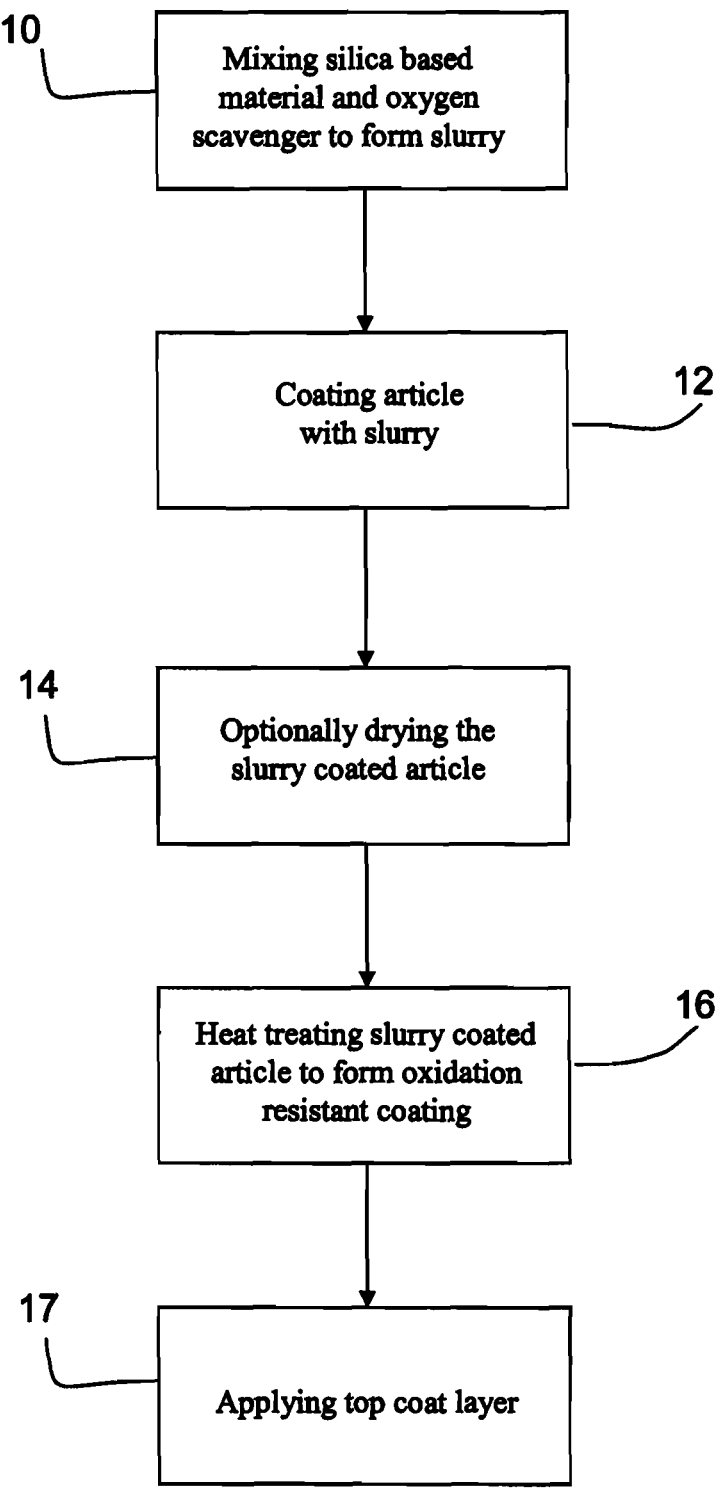
FIG. 1 is a representation of a flowchart of a process of the present invention.

Referring now to FIG. 1, a flowchart representing one exemplary process of the present invention is shown. A process for applying an oxidation resistant coating may comprise mixing at least about 10% by volume to up to about 99% by volume of at least one silica based material and at least about 1% by volume to up to about 90% by volume of at least one oxygen scavenger in a liquid medium to form a slurry at a step 10 of FIG. 1. Suitable liquid media include, but are not limited to, water, alcohols, binders, terpineol, organic dispersants known to one of ordinary skill in the art, solutions comprising the aforementioned materials, mixtures thereof, and the like. The aforementioned binders may be organic-based liquid media such as acrylic or inorganic-based such as colloidal silica. Suitable mixing processes may include, but are not limited to, mechanical mixing techniques, manual mixing techniques, ultrasonics, cavitation, agitation, combinations comprising these techniques, and the like. For example, representative mechanical mixing techniques may include grinding, ball mixing, high energy milling (e.g., Spex), shear mixing, stirring, centrifugal mixing, combinations comprising at least one of the foregoing, and the like.

Suitable silica based materials may comprise silica, modified silica, and the like. Modified silica may comprise silica modified by other compounds or elements, for example, silicates such as sodium silicate, borosilicates, hafnium silicates, zirconium silicates, and mixtures thereof. These various silica based materials exhibit a viscosity of about $1\times10^2$ poise to about $1\times10^7$ poise in a temperature range of about 1,292° F. (700° C.) to about 3,272° F. (1,800° C.), possess a particle size range of about 150 mesh to about 325 mesh, and form a viscous glass phase material when heat treated that is suitable as a carrier for at least one oxygen scavenger. This viscosity range permits easier inclusion and dispersion of the oxygen scavengers throughout the silica based materials during the coating and heat treatment steps.

The oxidation resistant coating of the present invention provides oxidation resistance primarily by active reaction with oxygen rather than only providing a passive barrier to oxygen flow to an article's surface. As the coating(s) are exposed to oxidative operating conditions, the coating(s) erodes and exposes the oxygen scavenger additives. The oxygen scavengers oxidize to form non-gaseous oxidation products such as $SiO_2$, $Al_2O_3$, $B_2O_3$, etc., which then add to and rebuild the coating. The glassy phase flows at elevated temperature to seal cracks and accommodate mismatches of the coefficient of thermal expansion of the various layers. As a result, the coating in turn resists spallation and cracking and instead relieves the stress caused by the formation of the non-gaseous oxidation products.

The oxygen scavenger may be defined to be any element or compound or multiphase component that reacts with oxygen to form a relatively stable, non volatile oxygen-containing compound or phase. Suitable oxygen scavengers may comprise silicides and/or borides of aluminum, molybdenum, tantalum, chromium, titanium, hafnium, zirconium, yttrium, mixtures thereof, and the like. In addition, other refractory metals, and other metals that form refractory oxides, silicates, borides, and mixtures thereof, known to one of ordinary skill in the art may also be utilized as suitable oxygen scavengers. The volume % of the oxygen scavenger within the layers of coating may preferably be in the range of about 1% to about 90% by volume of the layers of coating, and more preferably in the range of about 5% to about 75% by volume of the layers of coating.

If necessary, a viscosity modifier may be added to the slurry in an amount sufficient to rheologically control the viscosity of the targeted glass phase(s). Suitable viscosity modifiers may include, but are not limited to refractory materials, metal oxides, mixed metal silicates, mixtures thereof, and the like. Optionally, a viscosity modifier additive may be added to the slurry to impart steam resistance to the article. In the alternative, the silica based material may also include, as part of its composition, the viscosity modifier additive. Suitable viscosity modifier additives may include mullite, alkaline earth aluminosilicates including barium strontium aluminosilicate (BSAS) and strontium aluminosilicate (SAS), yttrium silicates, rare earth silicates, hafnium or zirconium silicate, oxides of hafnium, zirconium, titanium, silicon, yttrium, rare earth metals, tantalum, niobium, aluminum and mixtures thereof, and the like. In addition, these viscosity modifier additives may also be used to impart additional steam resistance.

Referring again to FIG. 1, a substrate may be coated with the slurry at step 12. The substrate may comprise an article for which the desired oxidation protection is sought. Any one or more of a number of coating techniques known to one of ordinary skill in the art may be utilized. For example, suitable coating techniques may include, but are not limited to, thermal spraying, chemical vapor deposition, physical vapor deposition, electrophoretic deposition, electrostatic deposition, preceramic polymer pyrolysis, sol-gel, slurry coating, dipping, air-brushing, sputtering, slurry painting or any combination thereof. In addition, suitable coating techniques may also include high velocity oxygen fuel processes, low pressure plasma spray processes, and the like. When applying multiple layers of oxidation resistant coatings, particularly suitable coating techniques include polymer impregnation processes, chemical vapor deposition processes, physical vapor deposition processes, and combinations thereof. Each oxidation resistant coating(s) should be disposed upon the article at a thickness of greater than or equal to about 0.05 mils (0.00005 inch), preferably between about 0.1 to about 300 mils and ideally between about 0.1 to about 10 mils.

When utilizing certain coating processes, the liquid medium remains and may form a film or residue upon the slurry coated substrate. If such residue(s) remain, the slurry coated substrate may be dried at step 14 of FIG. 1 such that the residue is oxidized and "burned out". For example, the slurry coated substrate may be dried at about 350° C. for about 30 minutes to about 60 minutes. Optionally, steps 12 and 14 may be repeated as often as necessary to achieve the desired thickness, coating weight, other desired properties, and the like, of a coating layer prior to heat treating the coated article at step 16 of FIG. 1.

Figure 3:
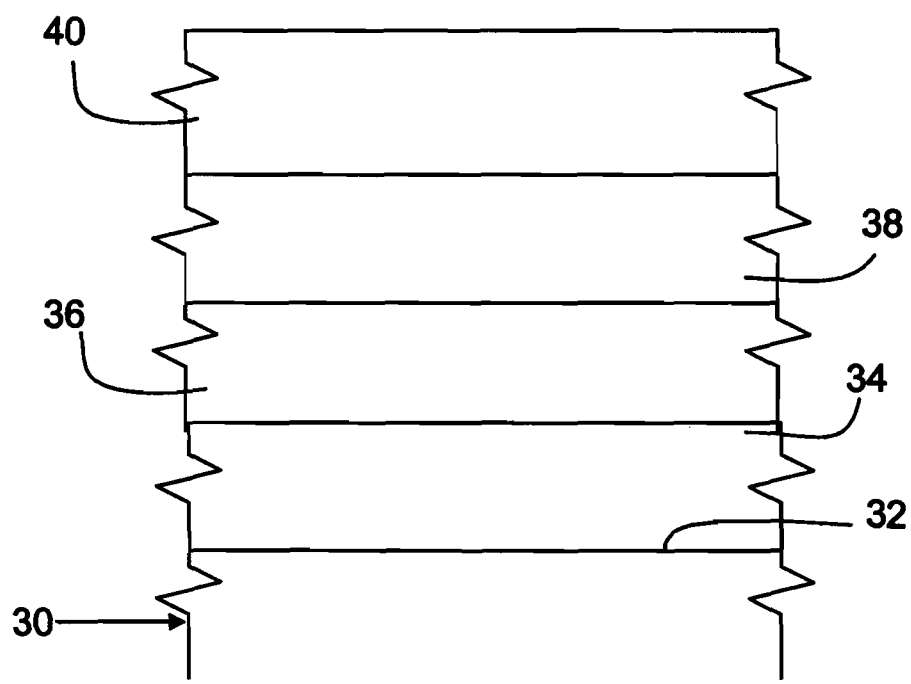
FIG. 3 is a representation of an article coated with multiples layers of the oxidation resistant coating of the present invention.

The process of the present invention may be repeated so as to form at least one layer of the oxidation resistant coating described herein, that is, multiple layers of oxidation resistant coatings as shown in FIG. 3. For example, steam protection may be imparted by the use of a top layer comprising a steam resistant material, such as the aforementioned viscosity modifiers, as known to one of ordinary skill in the art.

Figure 2:
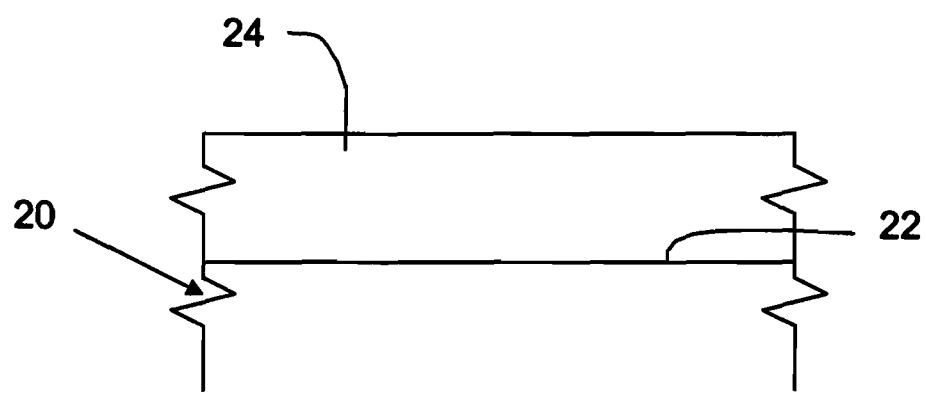
FIG. 2 is a representation of an article coated with an oxidation resistant coating of the present invention.

Referring again to FIG. 1, the slurry coated substrate may be heat treated to form the oxidation resistant coating of the present invention at step 16. The reaction product of the silica based material(s), oxygen scavenger(s) and optional alkaline earth material additive(s) form a layer of glass containing the oxygen scavengers dispersed through the layer. The heat treatment may be carried out using any one of a number of techniques known to one of ordinary skill in the art. The heat treatment temperature range may preferably be about 932° F. (500° C.) to about 3,272° F. (1,800° C.), and depends on the constituents of the slurry. For example, a substrate coated with a slurry containing silica-based glass and an oxygen scavenger may require being heat treated in a temperature range of about 1,000° F. (538° C.) to about 1,500° F. (816° C.) for a period of time sufficient to form the oxidation resistant coating. Optionally, steps 14 and 16 may be repeated as necessary, prior to applying the top coat layer at step 17, in order Referring now to FIGS. 2 and 3, an article coated with the oxidation resistant coating of the present invention is shown. An article 20 may comprise any part, component of a part, etc. that requires protection from oxidation across a temperature range of about 20° F. (65° C.) to about 3,000° F. (1,650° C.). Such articles may include, but are not limited to, turbine engine components such as nozzles, flaps, seals, shrouds, and the like, hypersonic engine components such as leading edges and heat exchangers, and hypersonic components such as hypersonic airfoil surfaces, and the like.

The articles may comprise any suitable material, such as, for example, silicon-containing substrates (i.e., silicon-containing ceramics, silicon-containing metal alloys, etc.) Suitable silicon-containing ceramics include, but are not limited to, silicon nitride, silicon carbide, silicon carbonitride, silicon oxycarbides, silicon carbide composites, silicon nitride composites, silicon oxynitrides, silicon aluminum oxynitrides, silicon nitride ceramic matrix composites, etc. Suitable silicon-containing metal alloys include, but are not limited to, molybdenum silicon alloys, niobium silicon alloys, iron silicon alloys, cobalt silicon alloys, nickel silicon alloys, tantalum silicon alloys, refractory metal silicides, etc.

Article 20 may include at least one surface 22 having an oxidation resistant coating 24 disposed thereupon according to any one of the processes described herein. In addition, the process of the present invention may be repeated so as to apply, deposit, etc., more than one layer of oxidation resistant coating upon the initial oxidation resistant coating 24. For example, an article 30 may include at least one surface 32 having a first oxidation resistant coating 34, a second oxidation resistant coating 36 and a third oxidation resistant coating 38.

Additionally, a top coat layer 40 of FIG. 3 may be disposed upon the silica-based coating(s) to impart additional protection from oxidation or steam at step 17 of FIG. 1. Such top coat layers may contain a refractory material including oxides, borides, carbides, silicides, silicates, or mixtures thereof. Suitable refractory oxide materials may include, but are not limited to, at least one of the following oxides: $Ta_xO_y$ (where x=1 to 3 and y=1 to 5), $Nb_xO_y$ (where x=1 to 3 and y=1 to 5), MgO, CaO, SrO, BaO, $SiO_2$, $HfO_2$, $TiO_2$, $ZrO_2$, $Al_2O_3$, $Y_2O_3$, $La_2O_3$, rare earth oxides, mixtures thereof and the like. Any one of a number of coating techniques known to one of ordinary skill in the art may be utilized. For example, suitable coating techniques to apply the top coat layer may include, but are not limited to, thermal spraying, chemical vapor deposition, physical vapor deposition, electrophoretic deposition, electrostatic deposition, preceramic polymer pyrolysis, sol-gel, slurry coating, dipping, air-brushing, sputtering, slurry painting, high velocity oxygen fuel processes, low pressure plasma spray processes, and the like. Optionally, step 17 may be repeated as often as necessary in order to achieve the desired properties of the top coat layer.

The oxidation resistant coatings of the present invention provide advantages over the prior art and overcome obstacles unlike prior art coatings. First, the use of oxygen scavengers dispersed throughout the resultant coating circumvents the problems associated with coefficient of thermal expansion mismatches such as spallation and cracking of the coating(s) that would occur if the layers were applied as continuous coating(s). As the coating(s) are exposed to oxidative operating conditions, the coating(s) erodes and expose the oxygen scavenger additives. The oxygen scavengers oxidize to form non-gaseous oxidation products such as $SiO_2$, $Al_2O_3$, $B_2O_3$, etc., which then add to and rebuild the coating. The glassy phase flows at elevated temperature to seal cracks and accommodate mismatches of the coefficient of thermal expansion of the various layers. As a result, the coating in turn resists spallation and cracking. Moreover, substrates that are coated with the coatings of the present invention demonstrate an oxidation resistance that is five to nine times better than uncoated substrates.

Second, components in hypersonic and/or gas turbine applications require environmental protection in different conditions that may or may not include water vapor. For example, scramjet engine leading edges require dry oxidation resistance up to and greater than 3,000° F. (1,650° C.) while cooled CMC flow path components, e.g., heat exchangers, require protection under relatively high water vapor conditions as known to one of ordinary skill in the art. Multiple layers of the oxidation resistant coatings of the present invention may serve both purposes. Multiple layers may provide additional protection against steam. The multiple layers may be used to modify the heat flux through the coatings, e.g., modify emissivity, reflectance, etc.

One or more embodiments of the present invention have been described. Nevertheless, it will be understood that various modifications may be made without departing from the spirit and scope of the invention. Accordingly, other embodiments are within the scope of the following claims.

What is claimed is:

1. A process for applying an oxidation resistant coating to an article, comprising:
    forming a slurry consisting of at least about 10% by volume to up to about 99% by volume at least one silica based material having a viscosity of about $1\times10^2$ poise to about $1\times10^7$ poise at a temperature of about 1,292° F. (700° C.) to about 3,272° F. (1,800° C.), at least about 1% by volume to up to about 90% by volume of at least one oxygen scavenger selected from the group consisting of at least one silicide of molybdenum, chromium, titanium, hafnium, zirconium, yttrium, and mixtures thereof or a boride of at least one of the following: molybdenum, tantalum, chromium, titanium, hafnium, zirconium, yttrium and mixtures thereof, mullite to control viscosity of said slurry during a subsequent heat treatment step, and a liquid medium;
    coating an article with said slurry to form a slurry coated article; and
    heat treating under an inert atmosphere said slurry coated article to form an article having at least one oxidation resistant coating layer containing said at least one oxygen scavenger.

2. The process of claim 1, wherein said slurry forming step comprises using a mechanical mixing process comprising at least one of the following: ball mixing, grinding, high energy milling, attrition milling, centrifugal mixing, and combinations thereof.

3. The process of claim 1, wherein coating comprises at least one of the following processes: thermal spraying, chemical vapor deposition, physical vapor deposition, electrophoretic deposition, electrostatic deposition, preceramic polymer pyrolysis, sol-gel, slurry coating, dipping, air-brushing, sputtering, slurry painting, and combinations thereof.

4. The process of claim 1, wherein coating comprises a low pressure plasma spraying process or a high velocity oxygen fuel spraying process.

5. The process of claim 1, wherein heat treating comprises heating said slurry coated substrate at about 1,000° F. (538° C.) to about 2,552° F. (1,400° C.) for a period of time sufficient to form said oxidation resistant coating.

6. The process of claim 1, wherein said silica based material comprises a particle size range of about 150 mesh to about 325 mesh.

7. The process of claim 1, wherein said at least one oxygen scavenger comprises a particle diameter size range of about 0.5 microns to about 50 microns.

8. The process of claim 1, wherein said liquid medium comprises at least one of the following: water, alcohol, terpineol, colloidal silica, inorganic containing solvent, and organic containing solvent.

9. The process of claim 1, further comprising applying upon said oxidation resistant coating layer a top coat layer comprising at least one of the following: refractory oxide material, refractory carbide material, refractory boride material, refractory silicide material, and mixtures thereof.

10. The process of claim 9, wherein said refractory oxide material is selected from the group consisting of $Ta_xO_y$ (where x=1 to 3 and y=1 to 5), $Nb_xO_y$ (where x=1 to 3 and y=1 to 5), MgO, CaO, SrO, BaO, $SiO_2$, $HfO_2$, $TiO_2$, $ZrO_2$, $Al_2O_3$, $Y_2O_3$, $La_2O_3$, rare earth oxides, and mixtures thereof.

11. The process of claim 9, wherein applying comprises at least one of the following processes: thermal spraying, chemical vapor deposition, physical vapor deposition, electrophoretic deposition, electrostatic deposition, preceramic polymer pyrolysis, sol-gel, slurry coating, dipping, airbrushing, sputtering, slurry painting, high velocity oxygen fuel spraying, and low pressure plasma spraying.

12. The process of claim 1, wherein forming comprises a manual mixing process.

13. The process of claim 1, wherein said coating step comprises a painting process.

14. The process of claim 13, further comprising drying said slurry coated article at about 662° F. (350° C.) for about 30 minutes to about 60 minutes prior to heat treating said slurry coated article.

15. A process for applying an oxidation resistant coating to an article, comprising:

forming a slurry consisting of at least about 10% by volume to up to about 99% of volume of at least one silica based material having a viscosity of about $1\times10^2$ poise to about $1\times10^7$ poise at a temperature of about 1,292° F. (700° C.) to about 3,272° F. (1,800° C.), at least about 1% by volume to up to about 90% by volume of at least one oxygen scavenger, wherein said at least one oxygen scavenger is a silicide of any one of the following: molybdenum, chromium, titanium, hafnium, zirconium, yttrium, and mixtures thereof; and a boride of any one of the following: molybdenum, tantalum, chromium, titanium, hafnium, zirconium, yttrium, and mixtures thereof, mullite to control viscosity of said slurry during a subsequent heat treatment step, and a liquid medium;

coating an article with said slurry to form a slurry coated article; and heat treating under an inert atmosphere said slurry coated article to form an article having at least one oxidation resistant coating layer containing said at least one oxygen scavenger.

16. A process for applying an oxidation resistant coating to an article, comprising:

forming a slurry consisting of at least about 10% by volume to up to about 99% by volume of at least one silica based material having a viscosity of about $1\times10^2$ poise to about $1\times10^7$ poise at a temperature of about 1,292° F. (700° C.) to about 3,272° F. (1,800° C.), at least about 1% by volume to up to about 90% by volume of molybdenum silicide, mullite in an amount sufficient to rheologically control a viscosity of said slurry during a subsequent heat treatment, and water;

said forming step comprising ball mixing said slurry;

thermal spraying an article with said slurry to form a slurry coated article;

heat treating under an inert atmosphere said slurry coated article to form an article having at least one oxidation resistant coating layer; and applying a top coat formed from $Ta_xO_y$ where x=1 to 3 and y=1 to 5 upon said at least one oxidation resistant coating layer using a thermal spraying technique.

* * * * *